(12) United States Patent
Wittenberg et al.

(10) Patent No.: US 12,493,762 B2
(45) Date of Patent: Dec. 9, 2025

(54) IMAGING LENS SYSTEM AND SCAN ENGINE CHASSIS

(71) Applicant: Zebra Technologies Corporation, Lincolnshire, IL (US)

(72) Inventors: Carl D. Wittenberg, Water Mill, NY (US); Gary V. Seims, Jr., East Setauket, NY (US); Robert T. Roedig, Farmingdale, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/562,947

(22) PCT Filed: May 19, 2022

(86) PCT No.: PCT/US2022/030093
§ 371 (c)(1),
(2) Date: Nov. 21, 2023

(87) PCT Pub. No.: WO2022/251042
PCT Pub. Date: Dec. 1, 2022

(65) Prior Publication Data
US 2024/0249092 A1    Jul. 25, 2024

Related U.S. Application Data

(60) Provisional application No. 63/194,506, filed on May 28, 2021.

(51) Int. Cl.
G06K 7/10       (2006.01)
G02B 7/02       (2021.01)
G02B 7/09       (2021.01)

(52) U.S. Cl.
CPC ......... *G06K 7/10831* (2013.01); *G02B 7/025* (2013.01); *G02B 7/09* (2013.01); *G06K 7/10732* (2013.01)

(58) Field of Classification Search
CPC ............................ G06K 7/10831; G02B 7/025
USPC ....................................................... 235/454
See application file for complete search history.

(56) References Cited

U.S. PATENT DOCUMENTS 5,247,166 A      9/1993  Cannon et al.
10,033,917 B1*   7/2018  Silverstein ............... G02B 7/04
2009/0160998 A1* 6/2009  Fukamachi ............ H04N 23/54
                                                              156/60

(Continued)

FOREIGN PATENT DOCUMENTS

EP    2916259 A1    9/2015
EP    2940505 A1   11/2015

OTHER PUBLICATIONS

International Search Report and Written Opinion for International Application No. PCT/US2022/30093 mailed on Oct. 5, 2023.

*Primary Examiner* — Allyson N Trail
(74) *Attorney, Agent, or Firm* — Yuri Astvatsaturov

(57) ABSTRACT

A scan engine for capturing at least one image of an object appearing in an imaging field of view (FOV) is provided that includes an imaging system and a chassis. The imaging system includes a lens holder and at least one lens disposed within the lens holder. The lens holder includes a lens holder mounting portion. The chassis includes a chassis mounting portion adapted to couple with the lens holder mounting portion.

23 Claims, 9 Drawing Sheets

(56) References Cited

U.S. PATENT DOCUMENTS

| | | | |
|---|---|---|---|
| 2011/0290885 A1* | 12/2011 | Chen | G06K 7/10732 |
| | | | 235/462.21 |
| 2012/0092531 A1 | 4/2012 | Koziol et al. | |
| 2015/0062845 A1 | 3/2015 | Akashi | |
| 2015/0254485 A1 | 9/2015 | Feng et al. | |
| 2017/0011507 A1* | 1/2017 | Wong | G01M 11/0278 |
| 2017/0300728 A1 | 10/2017 | Feng et al. | |
| 2018/0352060 A1 | 12/2018 | Gifford et al. | |
| 2022/0247896 A1* | 8/2022 | DiVirgilio | G06K 7/10821 |
| 2023/0421918 A1* | 12/2023 | Feng | G06K 7/10732 |
| 2024/0176096 A1* | 5/2024 | Takimoto | G02B 7/04 |
| 2024/0249092 A1* | 7/2024 | Wittenberg | G06K 7/10831 |

* cited by examiner

IMAGING LENS SYSTEM AND SCAN ENGINE CHASSIS

CROSS-REFERENCE TO RELATED APPLICATIONS

The present application is a national stage of Patent Cooperation Treaty Application No. PCT/US2022/30093, filed on May 19, 2022, and incorporated herein by reference in its entirety.

BACKGROUND

Industrial scanners and/or barcode readers may be used in warehouse environments and/or other similar settings. These scanners may be used to scan barcodes and other objects. Such scanners are typically contained within a chassis to ensure optical components are protected from bumps, falls, and/or other potentially damaging events. In some environments, high powered scanners capable of scanning or resolving barcodes (e.g., 100 ml wide) across a wide range of distances, such as from a few inches to tens of feet, or more, may be desirable. Such systems require larger optics (e.g., imaging lens systems greater than approximately 6 mm in overall diameter) in order to meet performance requirements, but there remains a compromise between the lens system having a specific size while being constrained by the overall dimensions of the housing and the chassis. Also, compact imaging systems require high precision alignment of optics to prevent optical distortion, which can result in reduced efficiency of scanning rates, or faulty equipment. Further, larger systems may generate larger mechanical securing forces that could potentially damage the chassis or other components.

Accordingly, there is a need for improved designs having improved functionalities.

SUMMARY

In accordance with a first aspect, a scan engine for capturing at least one image of an object appearing in an imaging field of view (FOV) is provided that includes an imaging system and a chassis. The imaging system includes a lens holder and at least one lens disposed within the lens holder. The lens holder includes a lens holder mounting portion. The chassis includes a chassis mounting portion adapted to couple with the lens holder mounting portion.

In a variation of this embodiment, the lens holder mounting portion is arranged on an outer periphery of the lens holder and the chassis mounting portion is arranged on an outer periphery of the body of the chassis. In some examples, the lens holder mounting portion includes at least one tab. Further, the chassis mounting portion includes at least one hook adapted to engage the at least one tab of the lens holder mounting portion. In some of these examples, the outer periphery of the body of the chassis includes a reference positioning surface.

In some approaches, the scan engine may further include an aiming system and an illumination system. In these examples, each of the aiming system and the illumination system being at least partially disposed in the at least one cavity of the chassis.

In some examples, the scan engine may include a circuit board. At least a portion of the circuit board may be operably coupled with the imaging system. Further, in some examples, the scan engine may include an autofocus system operably coupled with the lens holder. In some examples, the lens holder may include a flex securing tab to communicatively couple the autofocus system with the circuit board. Further still, in these examples, the chassis may communicatively coupled with the circuit board via a flex tail connection. Further, in some examples, an epoxy may be provided that is disposed between the circuit board and the chassis. In these examples, the chassis may not be mounted to the circuit board via a mounting mechanism.

In some forms, the scan engine may include an epoxy disposed between the lens holder and the chassis.

In accordance with a second aspect, an assembly for capturing at least one image of an object appearing in an imaging field of view (FOV) is provided that includes a circuit board, an imaging system operably coupled with the circuit board, a chassis including a body defining at least one cavity, an aiming system, and an illumination system. The imaging system includes a lens holder and at least one lens disposed within the lens holder. The lens holder includes a lens holder mounting portion. The chassis further includes a chassis mounting portion that operably coupled with the lens holder mounting portion. The imaging system, aiming system, and illumination system are each communicatively coupled with the circuit board.

In accordance with a third aspect, an approach for assembling a scan engine for capturing at least one image of an object appearing in an imaging field of view (FOV) is provided. The approach includes operably coupling an imaging system including a lens holder adapted to retain at least one lens therein with a circuit board. The lens holder includes a lens holder mounting portion. Further, the approach includes positioning a chassis in a raised position relative to the circuit board. The chassis includes a body defining at least one cavity and further includes a chassis mounting portion. The approach further includes rotating the chassis to a lowered position whereby the chassis mounting portion couples with the lens holder mounting portion.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
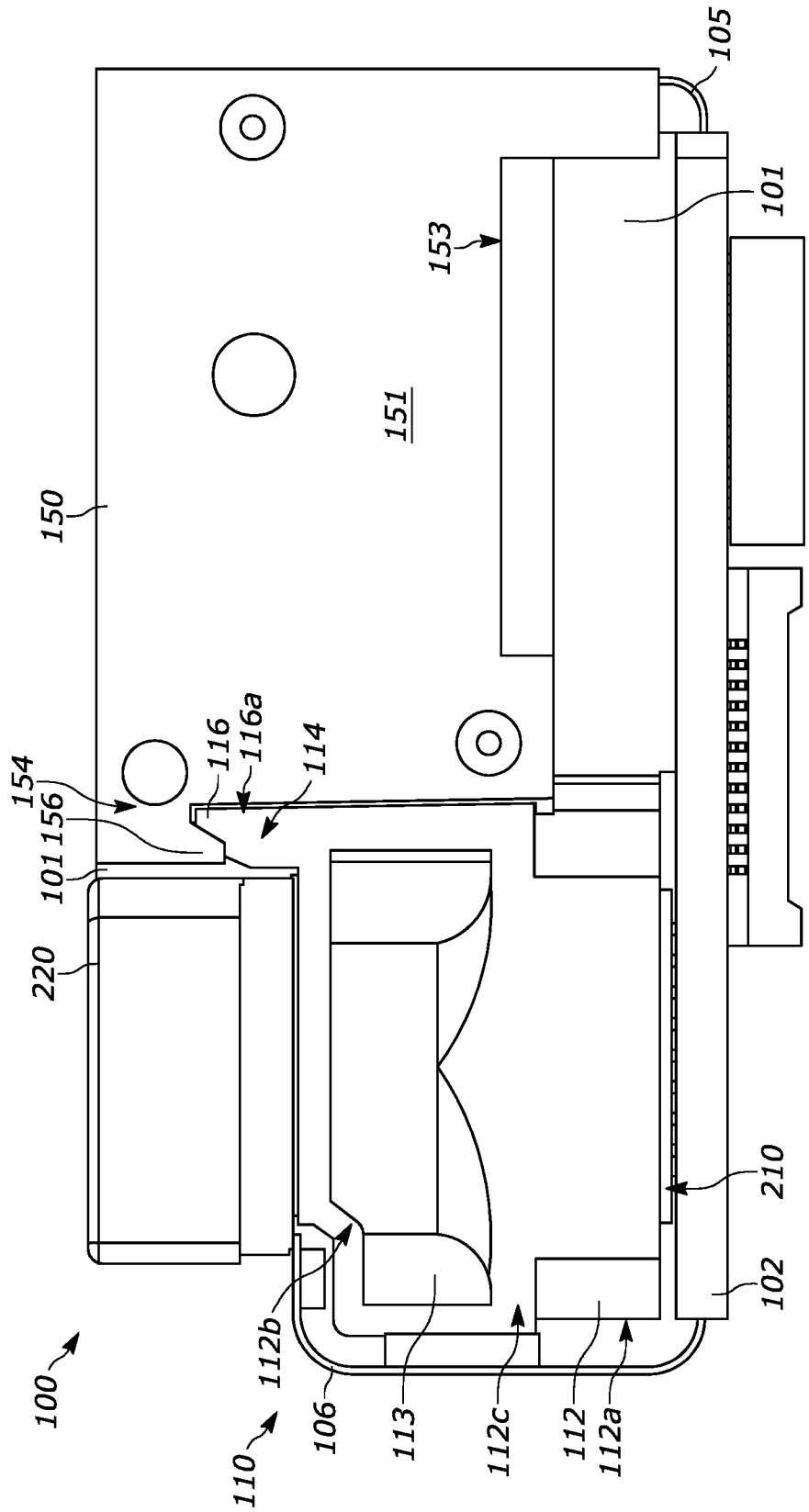
FIG. 1 illustrates a front elevation view of an example imaging assembly of an example scanner for capturing images of an object in accordance with various embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to these various embodiments, a high-performance autofocus barcode scanner is provided having reduced dimensional requirements, and a broad range of autofocus distances. More specifically, the scanners described herein may be operably coupled with a support chassis while still utilizing all of the available height within the scanner housing. By positioning the imaging lens system adjacent to the chassis (as compared with within the chassis), the imaging lens system is not constrained by an upper height (i.e., a vertical) dimension of the chassis, and as such, can be dimensioned to occupy the entire vertical dimension. As such, the scanner may incorporate larger, higher-powered optical units capable of resolving barcodes disposed at greater distances, and greater ranges of distances, from the scanner. The scanner also incorporates optical alignment features that provide very high precision alignment of the imaging optics allowing for the use of smaller, more compact, lenses and optical elements.

Turning to the figures, an assembly 100 or scan engine for capturing at least one image of an object appearing in an imaging field of view (FOV) is provided. The assembly 100 includes a circuit board 102, an imaging system 110 operably coupled with the circuit board 102, and a chassis 150. Further, in some examples, the system 100 may include an aiming system 170 and an illumination system 180, as well as any number of additional components used to assist with capturing an image or images of an object.

The circuit board 102 may include any number of electrical and/or electro-mechanical components (e.g., capacitors, resistors, transistors, power supplies, etc.) used to communicatively couple and/or control various electrical components of the assembly 100. For example, the circuit board 102 may include any number of component mounting portions 103, illustrated in FIG. 2, to receive components (e.g., the imaging system 110) to operably couple therewith, and may additionally include a board mounting region 104 used to secure the circuit board 102 with the scanner housing (not illustrated). In the example illustrated in FIG. 2, the circuit board 102 further includes a first flex tail connector 105 and a second flex tail connector 106. As will be discussed, the first flex tail connector 105 is used to communicatively couple components disposed within the chassis 150 with the circuit board 102, and the second flex tail connector 106 is used to communicatively couple the circuit board 102 with portions of the imaging system 110.

The imaging system 110 is also operably coupled with the circuit board 102. The imaging system 110 includes an autofocus system 220 and a rear lens holder 112, both containing lenses for imaging. The autofocus system 220 is positioned adjacent to and/or operably coupled with the rear lens holder 112. The rear lens holder 112 is in the form of a generally hollow body that defines a lower portion 112a, an upper portion 112b, and a sidewall 112c extending between the lower and upper portions 112a, 112b. The rear lens holder 112 may have any number of features such as shapes and/or cutouts 113 such that the sidewall 112c has a generally uniform thickness despite its unique shape that corresponds to the shape of the lens or lenses disposed therein. These cutouts 113 reduce overall weight of the rear lens holder 112, and due to the uniform thickness of the sidewall 112c, the rear lens holder 112 is easier to manufacture (e.g., mold via an injection molding machine) as compared with lens holders having varying thickness.

In some examples, the rear lens holder 112 is coupled with the circuit board 102 via the component mounting portion 103. As a non-limiting example, the component mounting portion 103 may be in the form of a pad to which the lower portion 112a of the rear lens holder 112 is pressed onto. The component mounting portion 103 may include an adhesive to assist in securing the rear lens holder 112 to the circuit board 102. In other examples, the component mounting portion 103 may include any number of electrical interconnects that receive corresponding electrical interconnects disposed or otherwise coupled with the rear lens holder 112. Other examples are possible.

Figure 2:
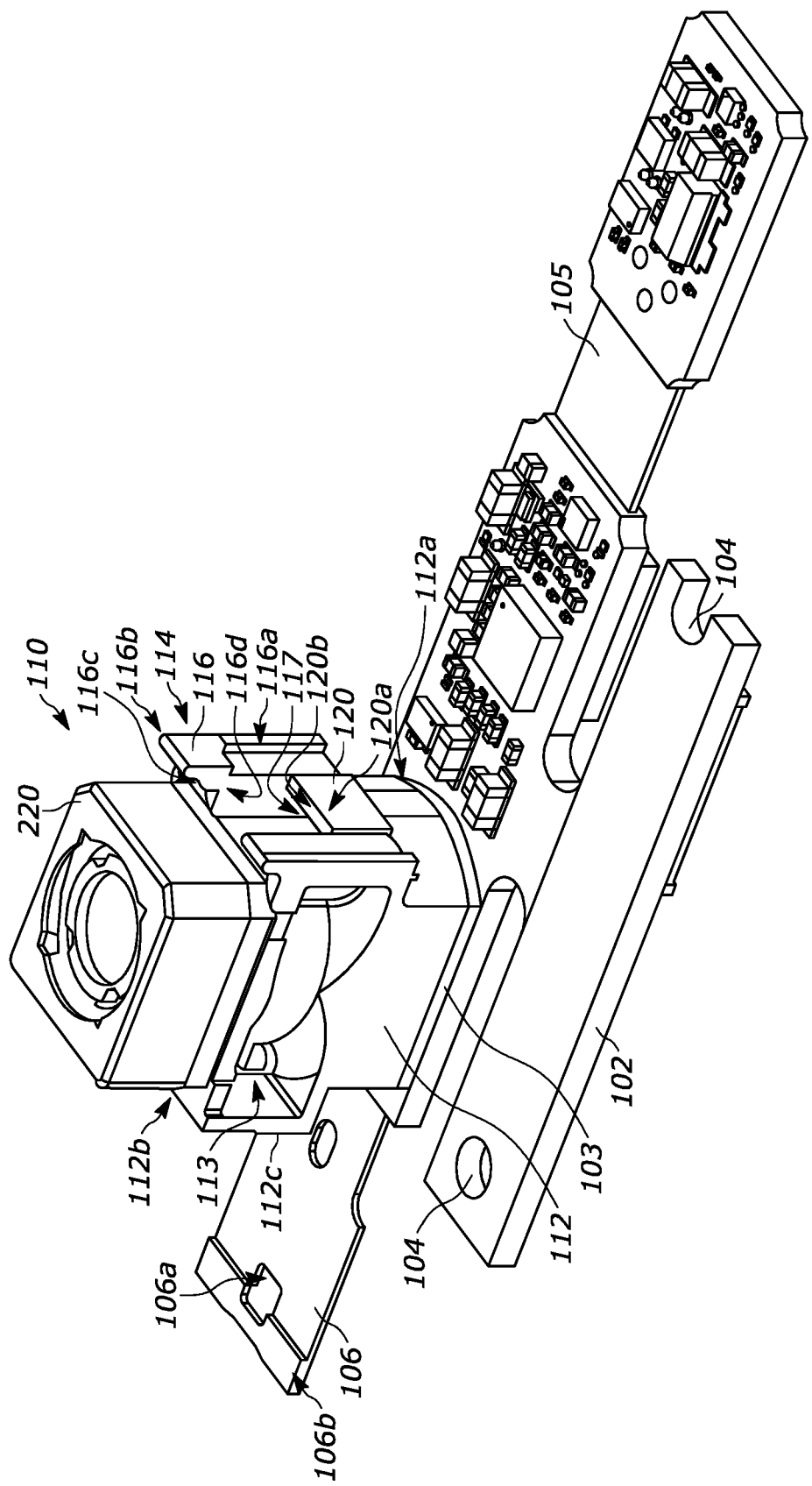
FIG. 2 illustrates a perspective view of the example imaging assembly of FIG. 1 in accordance with various embodiments.
Figure 3:
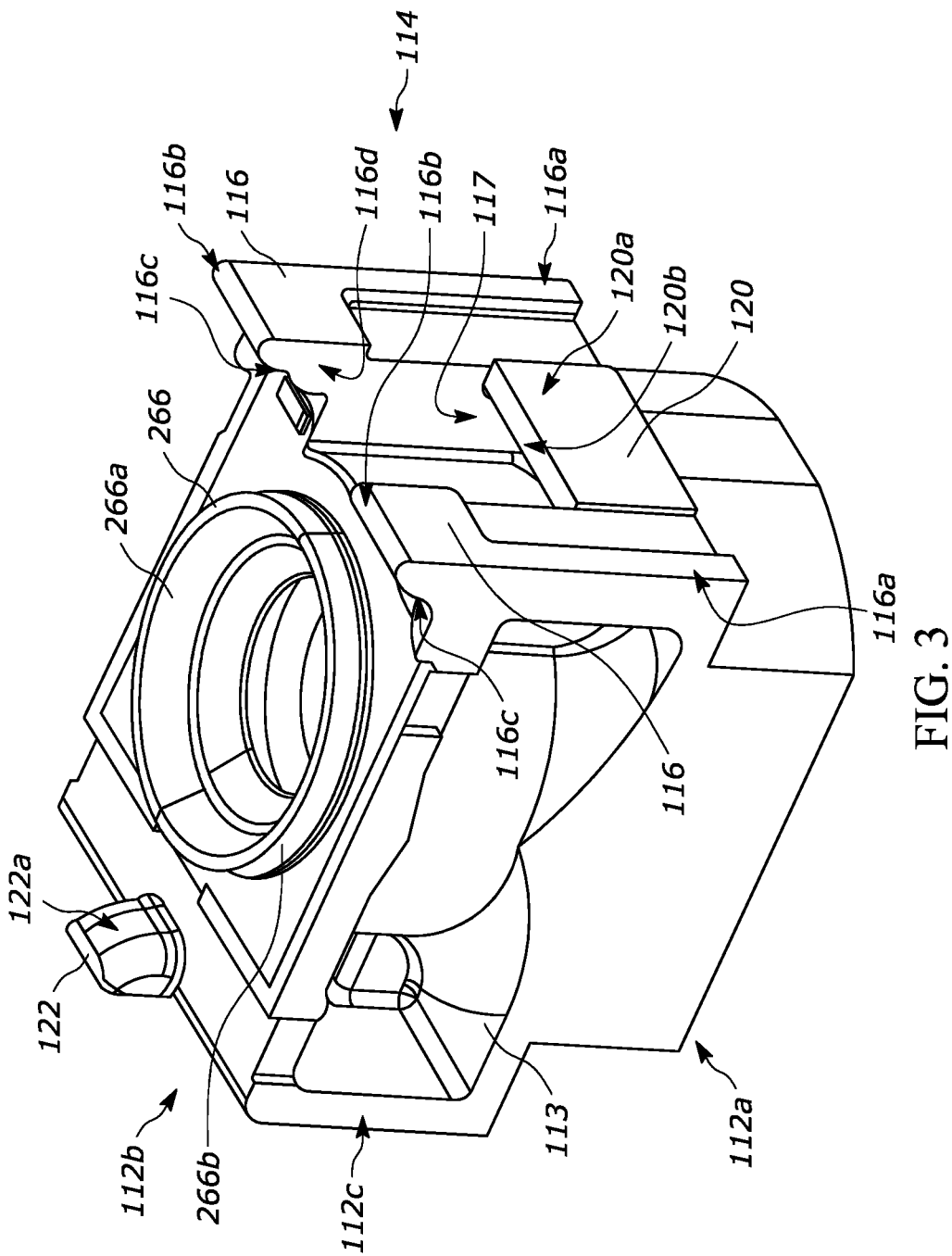
FIG. 3 illustrates a perspective view of an example lens holder for use with the example imaging assembly of FIGS. 1 & 2 in accordance with various embodiments.

The rear lens holder 112 further includes a lens holder mounting portion 114 positioned on an outer periphery of the sidewall 112c. The lens holder mounting portion 114 includes any number of upper tabs 116 and any number of lower tabs 120. As illustrated in FIG. 2, each of the upper tabs 116 includes a generally planar facing surface 116a, a curved upper surface 116b positioned adjacent to the facing surface 116a, an angled surface 116c positioned adjacent to the curved upper surface 116b, and an inner sidewall 116d positioned adjacent to the facing surface 116a, the curved upper surface 116b, and the angled surface 116c. In the illustrated example, the respective inner sidewalls 116d of each of the upper tabs 116 are arranged such that they face each other. The angled surface 116c is a generally planar surface that forms an angle relative to the facing surface 116a of approximately 30°. However, other examples of suitable angles are possible.

Each of the upper tabs 116 are separated by a cavity 117 at least partially defined by the inner sidewall 116d. The cavity 117 is further defined by the lower tab 120, which includes a generally planar facing surface 120a, an upper surface 120b positioned adjacent to the facing surface 120a, and an angled surface 120c positioned adjacent to the upper surface 120b. The angled surface 120c is a generally planar surface that forms an angle relative to the facing surface 120a of approximately 30°. However, other examples of suitable angles are possible. Further, while the upper surface 120b of the lower tab 120 is illustrated as a generally planar surface, in some examples, the upper surface 120b of the lower tab 120 may be curved. So configured, the cavity 117 is at least partially defined by the inner sidewalls 116d of the upper tabs 116, the sidewall 112c, and the angled surface 120c of the lower tab 120. In some examples, the width of the cavity 117 may gradually decrease from the upper portion 112b to the lower portion 112a.

The chassis 150 may be constructed from a rigid material such as a metal or metal alloy (e.g., zinc). The chassis 150 includes a body 151 that defines any number of cavities 152 in which components may be partially or fully disposed. For example, the aiming system 170 and/or the illumination system 180 may be at least partially disposed within the cavity 152 of the chassis 150. The aiming system 170 may include components to generate a cosmetic pattern to assist with identifying where the imaging system 110 is aiming. In some examples, the aiming system 170 may include laser and/or light emitting diode ("LED") based illumination sources. The illumination system 180 assists with illuminating the desired target for the imaging system 110 to accurately capture the desired image. The illumination system 180 may include a LED or an arrangement of LEDS, lenses, and the like. For the sake of brevity, the aiming system 170 and the illumination system 180 will not be described in substantial detail.

The body 151 of the chassis 150 may include a recessed portion 153 that is adapted to receive a portion of the first flex tail connector 105 (e.g., a sub-board or an interconnect member). The chassis 150 further includes a chassis mounting portion 154 disposed or positioned on an outer periphery of the body 151 of the cavity 150. The chassis mounting portion 154 includes a reference surface 155, any number of upper hooks 156, and any number of lower hooks 160.

Figure 4:
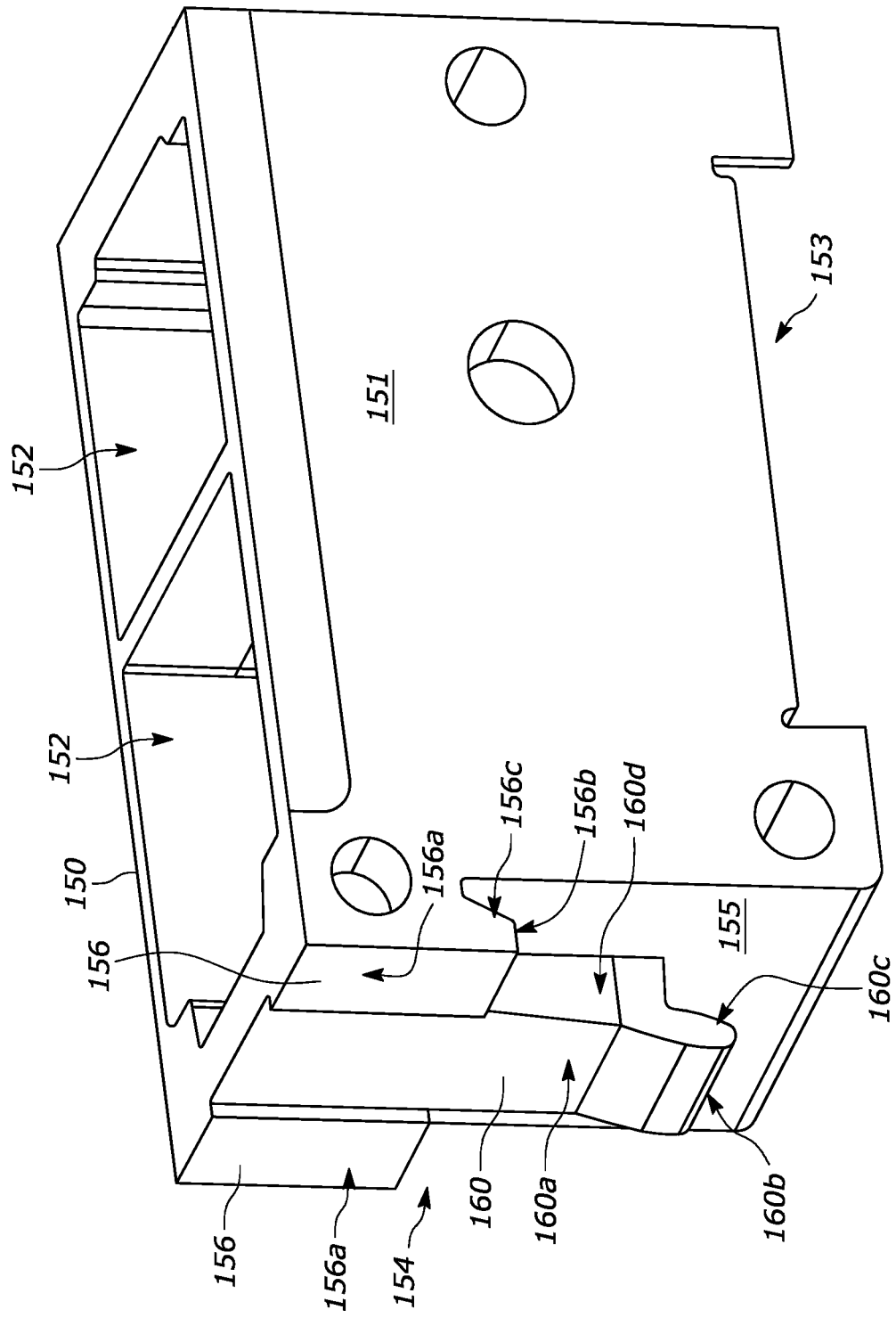
FIG. 4 illustrates a perspective view of an example chassis for use with the example imaging assembly of FIGS. 1 & 2 in accordance with various embodiments.

As illustrated in FIG. 4, each of the upper hooks 156 includes a generally planar facing surface 156a, a lower surface 156b (which, in some examples, may be curved) positioned adjacent to the facing surface 156a, and an angled surface 156c positioned adjacent to the lower surface 156b. The angled surface 156c is a generally planar surface that forms an angle relative to the facing surface 156a of approximately 30°. However, other examples of suitable angles are possible. Notably, and as will be discussed in further detail below, the angled surface 156c of the upper hooks 156 is configured to abut the corresponding angled surface 116c of the upper tabs 116 of the lens holder mounting portion 114. Similarly, the angle formed between the angled surface 156c and the facing surface 156a is adapted to correspond to the angle formed between the angled surface 116c and the facing surface 116a of the upper tabs 116.

As with the upper hooks 156 of the chassis mounting portion 154, the lower hook 160 of the chassis mounting portion 154 includes a generally planar facing surface 160a, a curved lower surface 160b positioned adjacent to the facing surface 160a, an angled surface 160c positioned adjacent to the lower surface 160b, and outer sidewalls 160d. The angled surface 160c is a generally planar surface that forms an angle relative to the facing surface 160a of approximately 30°. However, other examples of suitable angles are possible. Notably, and as will be discussed in further detail below, the angled surface 160c of the lower hook 160 is configured to abut the corresponding angled surface 120c of the lower tab 120 of the lens holder mounting portion 114. Similarly, the angle formed between the angled surface 160c and the facing surface 160a is adapted to correspond to the angle formed between the angled surface 120c and the facing surface 120a of the lower tab. As illustrated in FIG. 4, the lower hook 160 protrudes outwardly from the reference surface 155. Further, the lower hook 160 may have a width that corresponds to the width of the cavity 117. In examples where the cavity 117 has a reducing or tapered width, the width of the lower hook 160 may also be similarly tapered.

Figure 5:
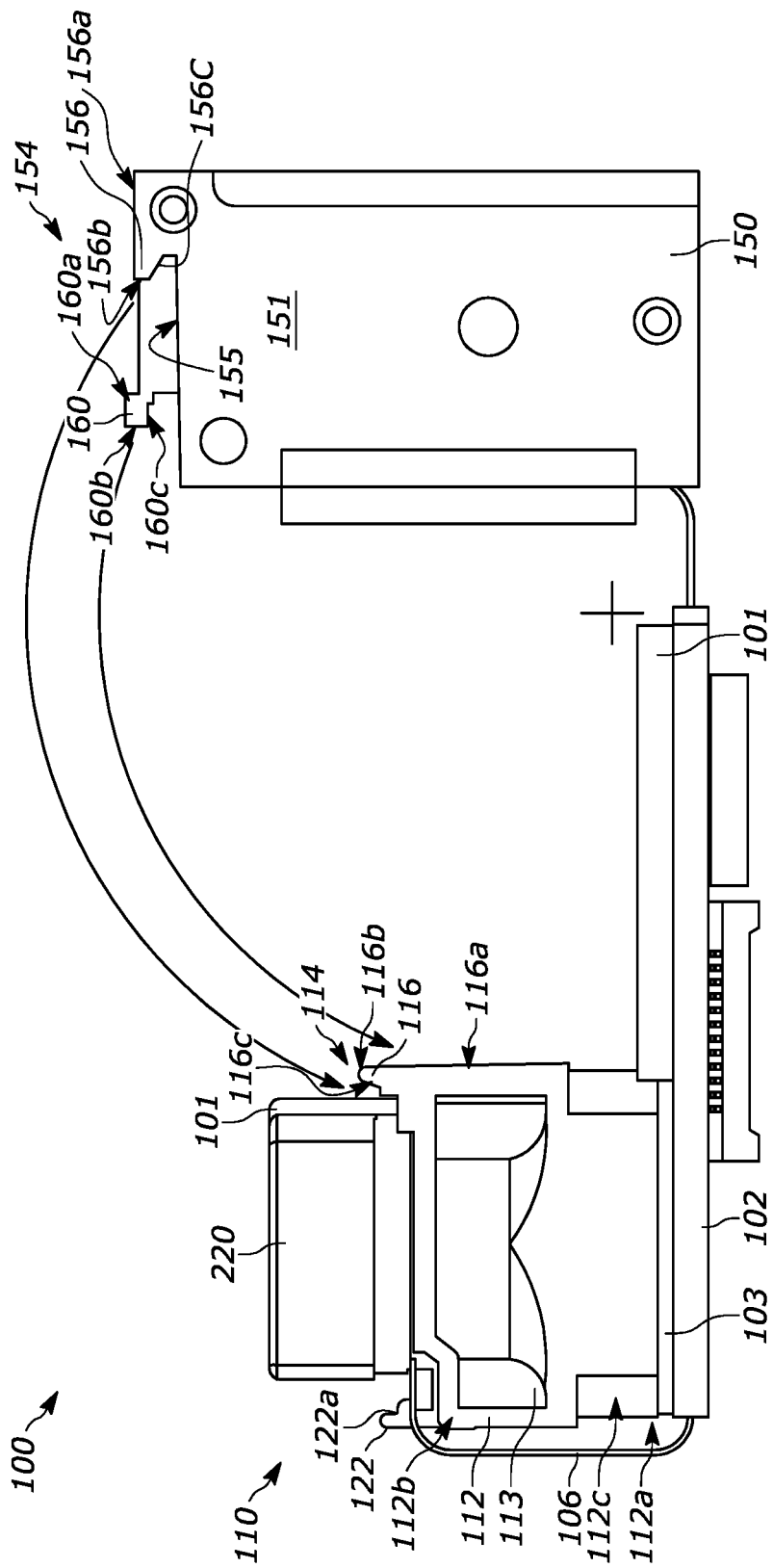
FIG. 5 illustrates a front elevation view of the example imaging assembly of FIGS. 1-4 during a manufacturing process in accordance with various embodiments.

With reference to FIG. 5, the assembly 100 is assembled by first coupling the imaging system 110 (i.e., the lower portion 112a of the rear lens holder 112) with the circuit board 102 (i.e., the component mounting portion 103). Next, the first flex tail connector 105 is coupled with the components disposed within the cavity or cavities 152 by inserting the end of the first flex tail connector 105 into the recessed portion 153 of the chassis 150. Next, the chassis 150 is positioned in the illustrated raised position relative to the circuit board 102. As indicated by the arrows in FIG. 5, the chassis 150 is rotated to a lowered position whereby the chassis mounting portion 154 couples with the lens holder mounting portion 114. More specifically, the curved lower surface 160b of the lower hook 160 of the chassis 150 enters the cavity 117 formed by the lens holder mounting portion 114 and engages the corresponding upper surface 120b of the lower tab 120 of the rear lens holder 112, and the lower surface 156b of the upper hooks 156 of the chassis 150 engage the corresponding curved upper surface 116b of the upper tabs 116 of the rear lens holder 112. As such, the chassis 150 may be rotated to its final position while hinging around the flex tail connector 105 with the circuit board 102 without interference. In some examples, the widths of the cavity 117 and the lower hook 160 are dimensioned to create a close fit when coupled together.

Figure 6:
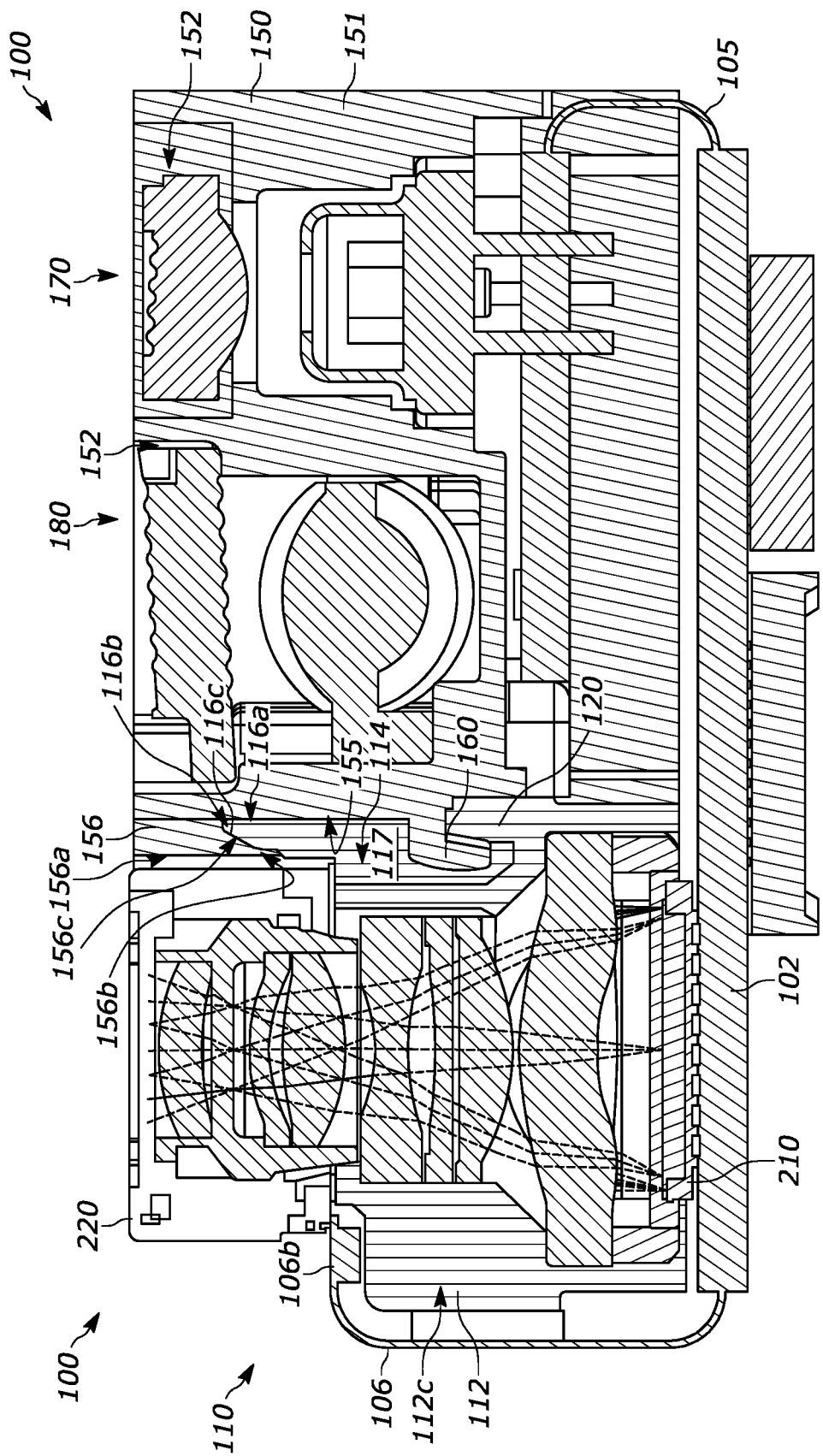
FIG. 6 illustrates a first front elevation cross-sectional view of the example imaging assembly of FIGS. 1-5 in accordance with various embodiments.
Figure 7:
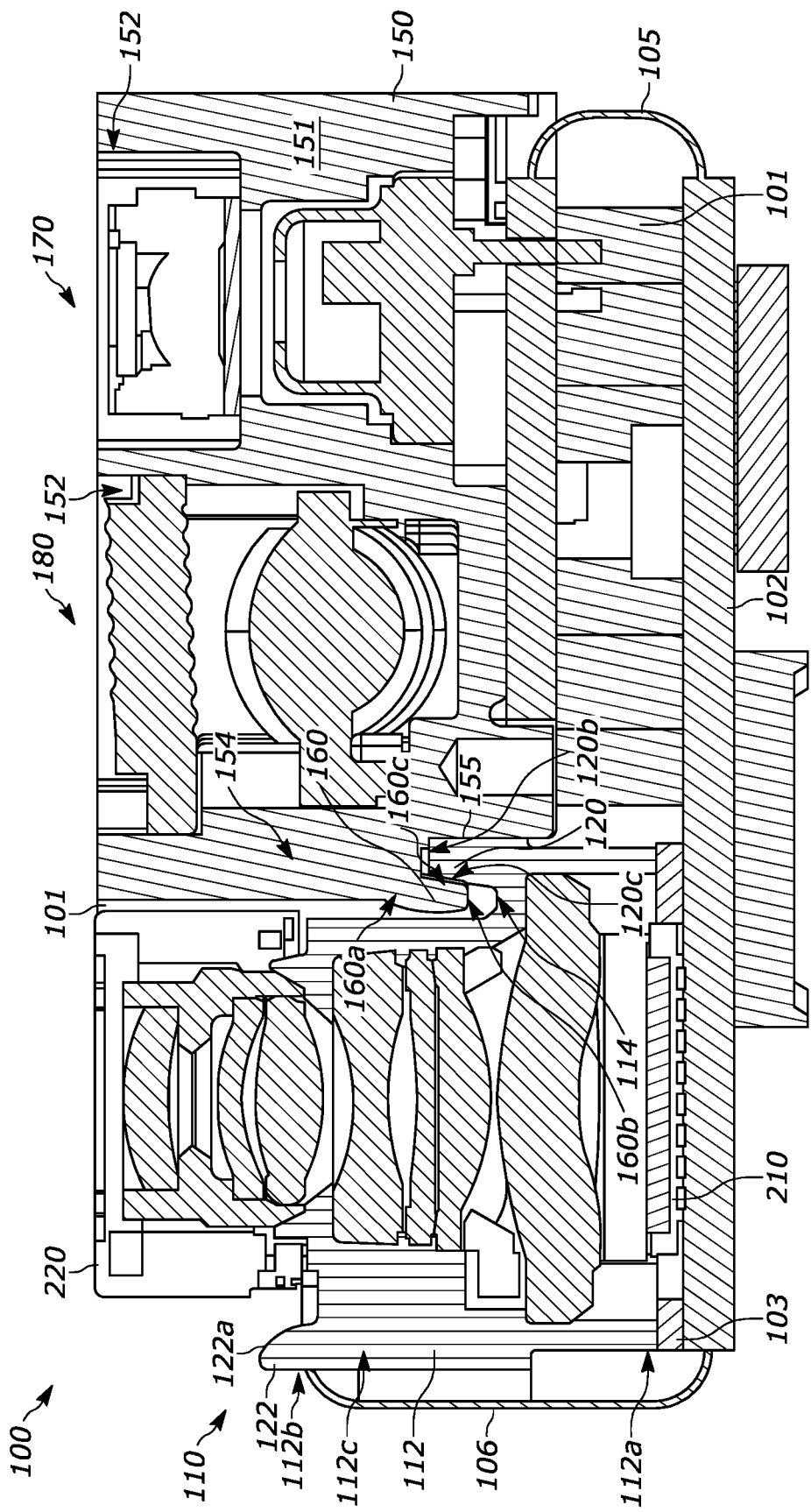
FIG. 7 illustrates a second front elevation cross-sectional view of the example imaging assembly of FIGS. 1-6 in accordance with various embodiments.

The lower tab 120 of the rear lens holder 112 and the lower hook 160 of the chassis 150 engage each other to move, urge, or squeeze the chassis 150 against the rear lens holder 112 (FIGS. 6 and 7), and the upper tabs 116 of the rear lens holder 112 and the upper hooks 156 of the chassis 150 act as wedges that slide against each other (via the angled surfaces 116c, 156c) until movement is restricted (FIG. 6).

In this arrangement, additional cavities may be formed between the lens holder mounting portion 114 and the chassis mounting portion 154. An epoxy or other adhesive 101 may be applied in these regions between the lens holder mounting portion 114 and the chassis mounting portion 154 to ensure the components may not move or separate relative to each other. In some of these examples, coupling of the lens holder mounting portion 114 and the chassis mounting portion 154 results in specified dimensional tolerances that may be filled by the epoxy or adhesive 101. Accordingly, there is a reduced requirement that the lens holder mounting portion 114 and the chassis mounting portion 154 be precisely mated with each other, thereby reducing manufacturing costs. In some examples, portions of the chassis 150 may include curved or cylindrical surfaces to assist with locating and rotating the chassis 150 into its relative lowered position. Further, in some examples, an epoxy material 101 may be added below or between the chassis 150 and the circuit board 102.

As a result of the mating coupling between the lens holder mounting portion 114 and the chassis mounting portion 150, the reference positioning surface 155 of the chassis 150 abuts the facing surface 116a of the upper tabs 116 of the chassis. By providing precise dimensions of the chassis 150 (and in turn, of the reference positioning surface 155), precise relative positioning of the imaging system 110 and the chassis 150 (in addition to the components disposed therein) is achieved. The plane-to-plane engagement of the chassis 150 and the imaging system 110 remove three degrees of freedom (i.e., left-right motion, tip, and tilt), while the engagement between the upper and lower tabs 116, 120 of the lens holder 110 and the upper and lower hooks 156, 160 of the chassis 150 remove an additional degree of freedom (i.e., vertical movement). The remaining degrees of freedom are eliminated by a surface of a fixture used during the curing process for the epoxy or other adhesive. After moving the chassis 150 into position, a nesting surface positioned behind the components illustrated in FIG. 5 will provide for remaining alignment, thus removing the remaining two degrees of freedom.

Figure 8:
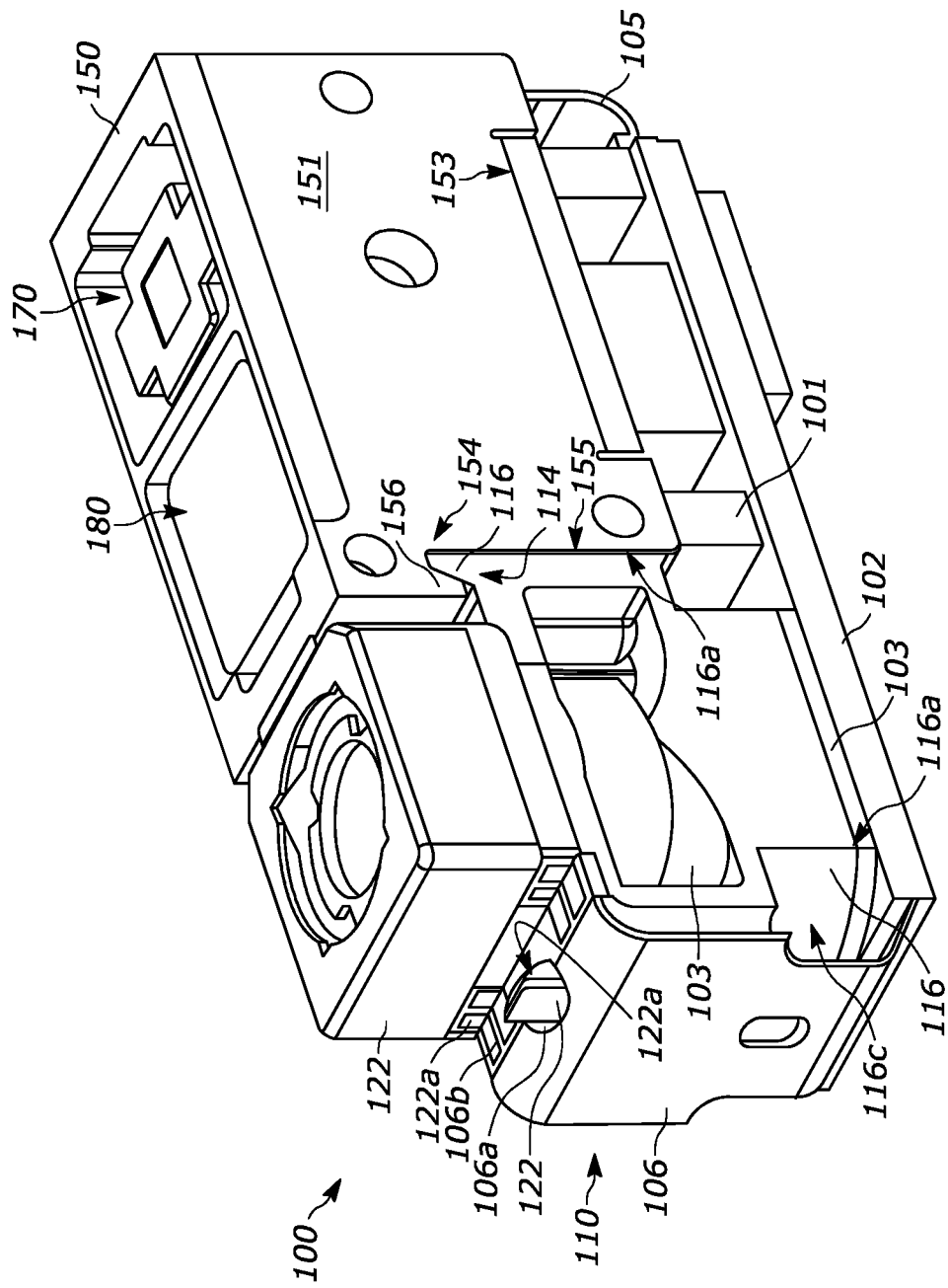
FIG. 8 illustrates a perspective view of the example imaging assembly of FIGS. 1-7 in accordance with various embodiments.
Figure 9:
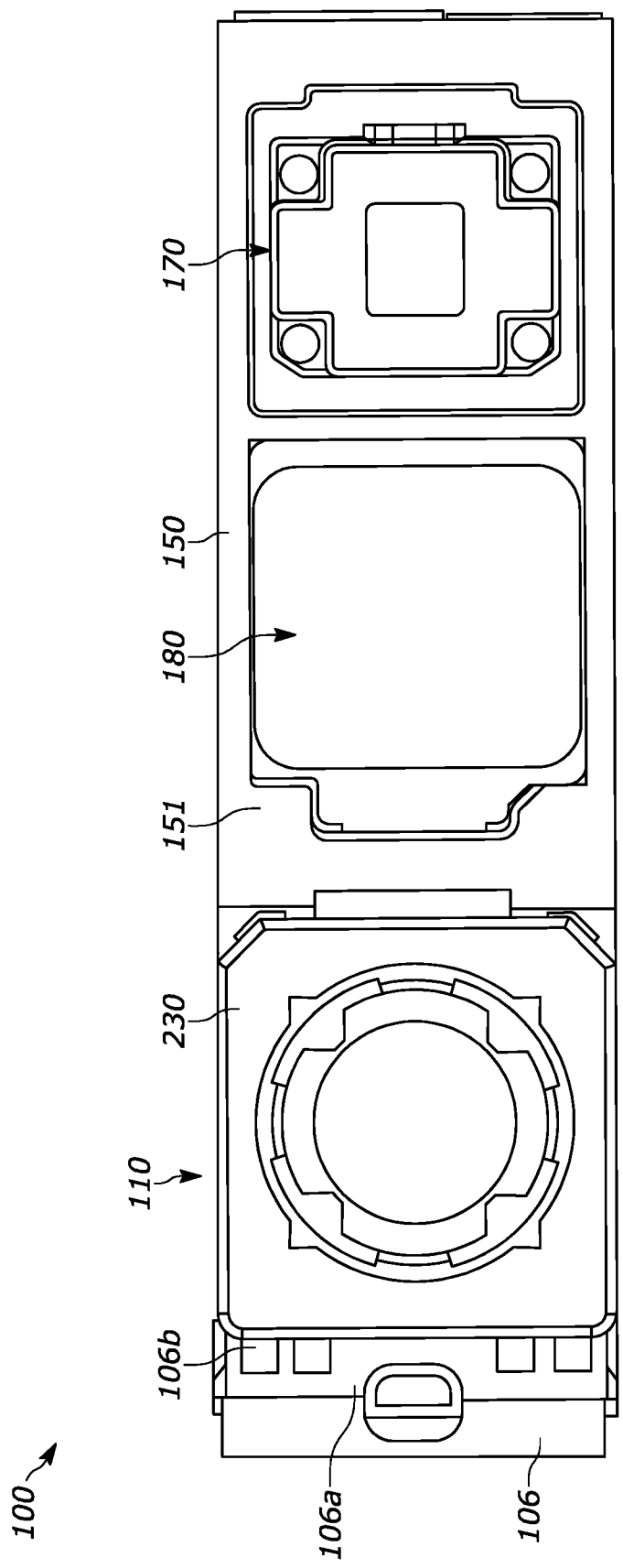
FIG. 9 illustrates a top plan view of the example imaging assembly of FIGS. 1-8 in accordance with various embodiments.

With reference to FIG. 8, the second flex tail connector 106 includes a mounting opening 106*a* and a number of interconnects 106*b*. The rear lens holder 112 includes a flex securing tab 122 that protrudes upwardly from the rear lens holder 112. The flex securing tab 122 includes an angled engaging surface 122*a* which is angled in a direction towards the autofocus system 220. When electrically coupling the autofocus system 220 with the circuit board, the second flex tail connector 106 is urged upward, and the mounting opening 106*a* is aligned with the flex securing tab 122. Because the engaging surface 122*a* of the flex securing tab 122 is angled towards the autofocus system 220, the interconnects 106*b* are moved or positioned against corresponding interconnects 220*a* positioned on the autofocus system 220, thereby communicatively coupling the autofocus system 220 with the circuit board 102. In some examples, the flex securing tab 122 may include a notch or other feature used to retain the second flex tail connector 106.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions.

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A scan engine for capturing at least one image of an object appearing in an imaging field of view (FOV), comprising:
    an imaging system including a lens holder and at least one lens disposed within the lens holder, the lens holder including a lens holder mounting portion;
    a chassis including a body defining at least one cavity, the chassis including a chassis mounting portion adapted to couple with the lens holder mounting portion; and
    an aiming system and an illumination system, each of the aiming system and the illumination system being at least partially disposed in the at least one cavity of the chassis,
    wherein the lens holder mounting portion is arranged on an outer periphery of the lens holder and the chassis mounting portion is arranged on an outer periphery of the body of the chassis.

2. The scan engine of claim 1, wherein the lens holder mounting portion includes at least one tab, wherein the chassis mounting portion includes at least one hook adapted to engage the at least one tab of the lens holder mounting portion.

3. The scan engine of claim 1, wherein the outer periphery of the body of the chassis comprises a reference positioning surface.

4. The scan engine of claim 1, further comprising an autofocus system operably coupled with the lens holder.

5. The scan engine of claim 1, further comprising a circuit board, wherein at least a portion of the imaging system is operably coupled with the circuit board.

6. The scan engine of claim 5, wherein the chassis is communicatively coupled with the circuit board via a flex tail connection.

7. The scan engine of claim 6, further comprising an epoxy disposed between the circuit board and the chassis.

8. The scan engine of claim 7, wherein the chassis is not mounted to the circuit board via a mounting mechanism.

9. The scan engine of claim 1, further comprising an epoxy disposed between the lens holder and the chassis.

10. The scan engine of claim 1, wherein the lens holder includes a core-out portion such that the lens holder has a uniform thickness.

11. An assembly for capturing at least one image of an object appearing in an imaging field of view (FOV), the assembly comprising:
    a circuit board;
    an imaging system operably coupled with the circuit board including a lens holder and at least one lens disposed within the lens holder, the lens holder including a lens holder mounting portion;
    a chassis including a body defining at least one cavity, the chassis including a chassis mounting portion adapted to operably couple with the lens holder mounting portion;
    an aiming system at least partially disposed within the at least one cavity; and
    an illumination system at least partially disposed within the at least one cavity;
    wherein the imaging system, the aiming system, and the illumination system are communicatively coupled with the circuit board, and
    wherein the lens holder mounting portion is arranged on an outer periphery of the lens holder and the chassis mounting portion is arranged on an outer periphery of the body of the chassis.

12. The assembly of claim 11, wherein the lens holder mounting portion includes at least one tab, wherein the chassis mounting portion includes at least one hook adapted to engage the at least one tab of the lens holder mounting portion.

13. The assembly of claim 11, wherein the outer periphery of the body of the chassis comprises a reference positioning surface.

14. The assembly of claim 11, further comprising an autofocus system operably coupled with the lens holder.

15. The assembly of claim 11, wherein the chassis is communicatively coupled with the circuit board via a flex tail connection.

16. The assembly of claim 11, further comprising an epoxy disposed between the circuit board and the chassis.

17. The assembly of claim 11, wherein the chassis is not mounted to the circuit board via a mounting mechanism.

18. The assembly of claim 11, further comprising an epoxy disposed between the lens holder and the chassis.

19. A method of assembling a scan engine for capturing at least one image of an object appearing in an imaging field of view (FOV), the method comprising:
    operably coupling an imaging system including a lens holder adapted to retain at least one lens therein with a circuit board, the lens holder including a lens holder mounting portion;
    positioning a chassis in a raised position relative to the circuit board, the chassis including a body defining at least one cavity, the chassis including a chassis mounting portion; and
    rotating the chassis to a lowered position whereby the chassis mounting portion couples with the lens holder mounting portion.

20. The method of claim 19, further comprising the step of applying an adhesive to at least one of the chassis or the lens holder.

21. The method of claim 19, further comprising aligning a reference positioning surface on an outer periphery of the body of the chassis with the lens holder.

22. The method of claim 19, further comprising the step of disposing an aiming system and an illumination system within the at least one cavity of the body of the chassis.

23. The method of claim 19, further comprising the step of operably coupling an autofocus system with the lens holder.

* * * * *